J. C. POTTER.
Plows.

No. 140,302. Patented June 24, 1873.

UNITED STATES PATENT OFFICE.

JOHN C. POTTER, OF ST. HELENA, CALIFORNIA.

IMPROVEMENT IN PLOWS.

Specification forming part of Letters Patent No. 140,302, dated June 24, 1873; application filed March 29, 1873.

*To all whom it may concern:*

Be it known that I, JOHN C. POTTER, of St. Helena, Napa county, State of California, have invented an Improved Vineyard-Plow; and I do hereby declare the following description and accompanying drawings are sufficient to enable any person skilled in the art or science to which it most nearly appertains to make and use my said invention or improvement without further invention or experiment.

My invention relates to certain improvements in single or hand plows, by which they are rendered more convenient for plowing close up against growing vines or trees, while it is equally as convenient for ordinary field-plowing as the common farm-plow.

In order to fully explain my invention reference is had to the accompanying drawing forming a part of this specification, in which—

Figure 1:
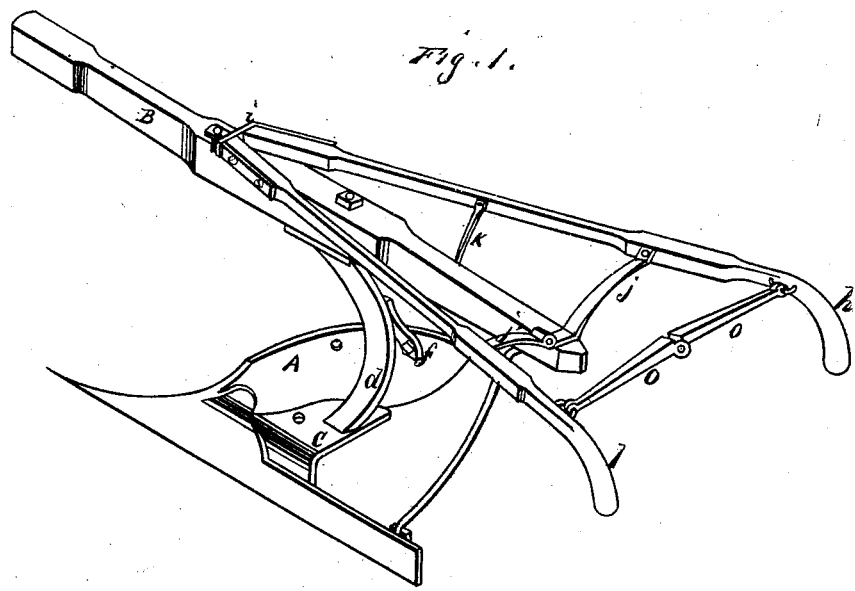
Figure 2:
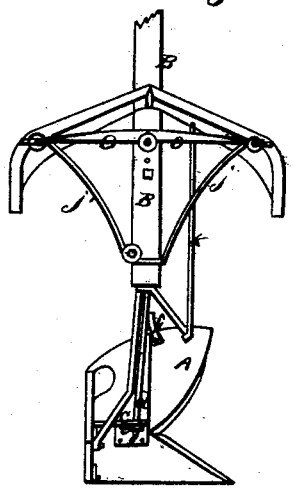

Figure 1 is a perspective view of my plow. Fig. 2 is a back view.

A is the mold-board, and B the plow-beam. A brace-place, C, is secured to the land-side of the plow at the rear of the mold-board, and extends partially across the width of the mold-board. To this plate the foot of the standard $d$ is secured by a bolt, $s$, which extends downward from the lower end of the standard, and passes through a hole in the plate, a nut, $e$, serving to secure it on the under side of the plate. The standard is also secured to the upper edge of the mold-board by a brace, $f$, which is also held in place by a bolt and nut. Two or more holes can be made through the plate C at different points between the middle of the mold-board and land-side, and corresponding holes will also be made in the upper edge of the mold-board, so that the standard can be shifted toward or from the land-side, as required. The upper end of the standard is secured to the plow-beam in the usual manner. The right handle $h$ is rigid, being secured at its forward end to a plate, $i$, on the plow-beam, and braced by a rod, $j$, from the rear end of the beam, and by another rod, $k$, from the outer edge of the mold-board. The opposite or left handle $l$ has its forward end hinged to the plate $i$, and is also supported by a hinged brace, $j'$, from the rear end of the plow-beam. A bar or brace, O, in the middle of which is an upward breaking hinge-joint, has its opposite ends secured by loose fastenings to the two handles $h$ $l$, so that by breaking the joint upward the left-handle $l$ can be closed upon the opposite one as far as necessary, thus throwing the handle out of the way, so that the point of the plow can be run close up to a tree, vine, or other growing plant without injuring it, and without annoying the plowman.

Either or both of the handles can be hinged so as to be thrown either to the center or to either side, as required, to avoid the vines.

By this construction of a plow the handles can be moved to any point required, or they can be fixed firmly in the usual position, so as to serve as an ordinary field-plow, thus combining in one plow all of the advantages of what is called a vineyard-plow and an ordinary plow, and avoiding the necessity of a farmer's keeping two classes of plows on hand.

Having thus described my invention, what I claim, and desire to secure by Letters Patent, is—

1. The rigid handle $h$, in combination with the hinged movable handle $l$, substantially as and for the purpose above described.

2. In combination with a rigid and a movable handle, the bracing-rod O provided with a rule-joint in the middle, substantially as and for the purpose above described.

In witness whereof I hereunto set my hand and seal.

JOHN C. POTTER. [L. S.]

Witnesses:
 D. O. HUNT,
 JAS. McGEE.